(12) United States Patent
Haider et al.

(10) Patent No.: US 12,430,540 B2
(45) Date of Patent: Sep. 30, 2025

(54) DATA-BASED ESTIMATION OF OPERATING BEHAVIOR OF AN MR DEVICE

(71) Applicant: Siemens Healthcare GmbH, Erlangen (DE)

(72) Inventors: Sultan Haider, Erlangen (DE); Georg Görtler, Baiersdorf (DE)

(73) Assignee: Siemens Healthineers AG, Erlangen (DE)

( * ) Notice: Subject to any disclaimer, the term of this patent is extended or adjusted under 35 U.S.C. 154(b) by 989 days.

(21) Appl. No.: 17/401,413

(22) Filed: Aug. 13, 2021

(65) Prior Publication Data
US 2022/0051082 A1 Feb. 17, 2022

(30) Foreign Application Priority Data

Aug. 13, 2020 (DE) .......................... 102020210308.9

(51) Int. Cl.
| | |
|---|---|
| *G06N 3/04* | (2023.01) |
| *G06N 3/044* | (2023.01) |
| *G06N 3/047* | (2023.01) |
| *G06N 3/08* | (2023.01) |

(52) U.S. Cl.
CPC ............. *G06N 3/047* (2023.01); *G06N 3/044* (2023.01); *G06N 3/08* (2013.01)

(58) Field of Classification Search
CPC ..................................................... G06N 3/045
See application file for complete search history.

(56) References Cited

U.S. PATENT DOCUMENTS

| | | | |
|---|---|---|---|
| 6,108,616 A | 8/2000 | Borchers et al. | |
| 10,515,316 B2 | 12/2019 | Goertler et al. | |
| 2017/0255723 A1* | 9/2017 | Asenjo | .................... G06F 30/20 |

(Continued)

FOREIGN PATENT DOCUMENTS

| | | |
|---|---|---|
| DE | 19732046 A1 | 1/1999 |
| DE | 102016212494 A1 | 1/2018 |

(Continued)

OTHER PUBLICATIONS

Kuhnert, Nadine, Lea Pflüger, and Andreas Maier. "Prediction of MRI Hardware Failures based on Image Features using Time Series Classification." arXiv e-prints (2020): arXiv-2001. (Year: 2020).*

(Continued)

*Primary Examiner* — Hal Schnee
(74) *Attorney, Agent, or Firm* — Banner & Witcoff Ltd.

(57) ABSTRACT

A method for computer-aided estimation of an operating behavior for an MR device having a set of device component. The method includes providing a memory with a set of digital models, wherein each digital model simulates the operating behavior of a respective component of the MR device, and wherein the digital models are interconnected in accordance with the structure and/or functionality of the MR device to form a higher-order model which simulates the operating behavior of the MR device, acquiring operating data of the MR device, and in an inference phase, accessing by a processor of the memory having the acquired operating data to estimate the operating behavior of the MR device in order to output a result.

11 Claims, 5 Drawing Sheets

(56) References Cited

U.S. PATENT DOCUMENTS

| | | | | |
|---|---|---|---|---|
| 2017/0286611 | A1* | 10/2017 | Goertler | G06N 20/00 |
| 2017/0316125 | A1* | 11/2017 | Jacobson | G06F 16/254 |
| 2018/0107729 | A1* | 4/2018 | Vyas | G06N 20/00 |
| 2019/0311078 | A1 | 10/2019 | Altmann et al. | |
| 2019/0357873 | A1 | 11/2019 | Uebler | |
| 2020/0166921 | A1 | 5/2020 | Lavid Ben Lulu et al. | |
| 2020/0317370 | A1* | 10/2020 | Somanath | G01M 15/14 |
| 2021/0298648 | A1* | 9/2021 | Hefner | A61B 5/1495 |
| 2022/0283566 | A1* | 9/2022 | Vance | G05B 19/41875 |

FOREIGN PATENT DOCUMENTS

| | | | |
|---|---|---|---|
| DE | 102019218138 | A1 | 5/2020 |
| EP | 3573073 | B1 | 12/2020 |

OTHER PUBLICATIONS

Zhang, Weishan, et al. "LSTM-based analysis of industrial IoT equipment." IEEE Access 6 (2018): 23551-23560. (Year: 2018).*
Dahmen, Jessamyn, and Diane Cook. 2019. "SynSys: A Synthetic Data Generation System for Healthcare Applications" Sensors 19, No. 5: 1181. https://doi.org/10.3390/s19051181 (Year: 2019).*
Office Action dated Feb. 19, 2021 for German Patent Application No. 102020210308.9.

* cited by examiner

DATA-BASED ESTIMATION OF OPERATING BEHAVIOR OF AN MR DEVICE

TECHNICAL FIELD

The present disclosure relates to a method, a system, a computer program product for estimating future operating behavior of an MRI scanner on the basis of neural networks. The present disclosure also relates to the application of such a method for various purposes, in particular for proactive fault monitoring.

BACKGROUND

An MRI scanner (hereinafter referred to as an MR device for short) is used to acquire sectional images of the body, parts of the body or other objects. The MR device generates a plurality of magnetic fields and alternating magnetic fields in the radiofrequency range to resonantly excite atomic nuclei in the body under examination. This induces an electrical signal in a receiver circuit. In order to be able to assign the signals to the individual volume elements or voxels in the body, spatial encoding is generated using linear location-dependent gradient fields. Thus, a slice selection gradient, a phase encoding gradient and a readout gradient are normally used. The data resulting from these measurements is entered line by line into a matrix, also known as k-space. K-space contains the summation signal of the horizontal spatial frequencies in the horizontal plane and the sum of the vertical spatial frequencies in the vertical plane. A two-dimensional Fourier transform can be used to separate the contributions of the individual frequencies in order to determine the signal strength for each voxel. Different designs of an MR device are known in principle. For example, in addition to the magnet that generates the static magnetic field, the RF system for generating the specific radio pulse, the above-mentioned gradient coils for generating the field gradients, the receive coil for registering the resonance signal generated, possibly shim coils and/or for example cryogenic superconducting coils, as well as computer-based units for controlling the system and/or for reconstructing the images can be used.

It will be obvious to persons skilled in the art that both the development and construction of an MR device and its operation are very complex, not only because of its large number of components. Both during the development and thus prior to commissioning of an MR device (to improve production) and during operation of an MR device (to optimize scans), there is a need to be able to model the operating behavior of the MR device in order to enable action to be taken accordingly.

SUMMARY

An object of the present disclosure is to enable the (in particular future) operating behavior of an MR device to be estimated. It is also desirable here to take actually measured data of an operating behavior into account in order to be able to make predictions as accurately and reliably as possible. In addition, the development and/or operation of MR devices shall be simplified, made safer and improved.

This object is achieved as claimed in the independent, subsidiary claims in each case. Advantageous aspects are set forth in the dependent claims, the description and the drawings.

According to a first aspect, an object is achieved by a computer-implemented method for estimating or predicting or calculating operating behavior for an MR device comprising a set of device components (hereinafter also referred to merely as components for short). The method comprises the step of providing a memory unit with a set of digital models which are preferably implemented as neural networks. A digital model simulates the operating behavior of a component of the MR device. Said digital models are combined to form a higher-order model such that they correspond to the design, structure and/or functionality of the MR device. In an application phase of the method, (real) operating data of the MR device is acquired. This is performed on a processor unit. The operating data can be provided, for example, in the form of event log data of an event log file of the MR devices. The application phase comprises an inference phase in which the processor unit accesses the memory unit with the acquired operating data in order to estimate the (future) operating behavior of the MR device and make it available as a result, preferably on an output unit. This phase is therefore called the inference phase, as neural network inference is performed here.

In an advantageous aspect, a comparator is accessed which is used to compare and process calculated intermediate results of the individual digital models across all components on the basis of the acquired operating data in order to calculate the result.

In a further advantageous aspect, the intermediate results are component-specific.

In another advantageous aspect, the comparator is used to compare timestamp data that is a segment of the operating data.

In another advantageous aspect, the model has been trained in a training phase on the basis of training data. In this case, a Markov model can be applied to synthetically generate operating data and training data. The Markov chain or Markov process is stochastic process for specifying probabilities for the occurrence of future events. A Markov chain is defined by the fact that even by knowing only a limited history, it is possible to make predictions about future developments that are just as good as if the entire history of the process (in this case, the event logs of the respective component of the MR device) were known. In the Markov chain, a state is defined by the ID number, the log and the MR sequence or the coil and the previous log. The transition matrix used here is a square matrix that assigns the probability of transition from state A to state B.

In another advantageous aspect, the digital model is or comprises a trained neural network, in particular an LSTM network. The advantage of this is that MR system states can be better stored and memorized. In the architecture proposed here, the LSTM is used as the prediction layer of the model. In particular, it is used to predict: the time at which the event entry (event log) occurred in the log file; the source or the component with its identification number that is predicted or to which the prediction relates; and the categorical message/test or a feature of the prediction encoded in a processable format, for example as an integer (for example "Patient table moved up" or "voltage xyz applied to gradient coil").

In another advantageous aspect, each digital model of the set of digital models provided has been trained individually. This enables the prediction reliability of the system to be improved.

In a further advantageous aspect, the higher-order cross-component model is self-learning in that the estimated operating behavior is compared with real operating behavior resulting from measured operating data in order to train the model in the event of deviation. The cross-component model can thus learn and generate new data.

In another advantageous aspect, the operating data comprises timestamp data and/or error messages and wherein the timestamp data can be transformed (in particular normalized and/or selected) according to a transformation rule.

In another advantageous aspect, a pattern recognition algorithm is run on the real measured operating data and/or the estimated operating data, in particular for gradient coil related operating parameters, for measurement sequence related parameters, for excitation pulses and/or for coil operating temperature.

In yet another advantageous aspect, the acquisition of operating data is triggered automatically during operation of the MR device and is performed in particular by readout from an event log file.

In the above, achievement of an object has been described with reference to the method. Features, advantages or alternative aspects mentioned are equally applicable to the other claimed subject matters and vice versa. In other words, the respective claims (relating, for example, to a system or to a computer program product) can also be further developed using the features described or claimed in connection with the method. The corresponding functional features of the method are implemented by corresponding modules, in particular by hardware modules or microprocessor modules, of the system or the product, and vice versa.

In another aspect, the disclosure relates to a server system for operating an MR device farm comprising a set of distributed MR devices, having: data interfaces to the MR devices; a model interface to the memory unit containing the stored models (neural networks, in particular the LSTM network); and a processor unit designed to carry out a method as described above.

The method can preferably be used for further processing of the estimated operating behavior in a production planning function (PPF) for production planning of an MR device to be produced, taking the estimated operating behavior into account.

Cumulatively or alternatively, the method can be used for further processing of the estimated operating behavior in a monitoring function for proactive monitoring of components of the MR device, in particular for proactive fault handling taking into account the estimated operating behavior. One advantage is that the defective component can be identified in advance before it enters a fault state. In this way, faults can be prevented from occurring. This is found to be particularly advantageous for complex technical systems such as an MR device.

An object is further achieved by a computer program product comprising a computer program having computer program code for carrying out all the steps of the method detailed above when the computer program is executed on a computer. It is also possible for said computer program to be stored on a computer-readable medium.

The terms used in this application will now be defined in more detail.

The MR device is used for the reconstruction of medical images. Depending on the application and intended use, the MR device can have a different structure and contain different components.

The term "components" shall be understood as meaning mechanical, physical and/or technical modules, units and apparatuses, as well as electronically controlled and/or computer-based units, which are required in connection with the design and application of an MR device. This includes the physical components of the MR device, such as coils, power supply cables, but also a patient table, actuators, sensors, etc. All the components are preferably implemented with a data interface to enable data to be exchanged, in particular to enable data to be sent and/or received.

The memory unit can be a physical or virtual memory, in particular a non-volatile memory, or a combination of a plurality of memories. The memory unit can be made up of different electronic memory components and can in particular comprise volatile semiconductor memory such as RAM (random access memory) or permanent memory such as ROM (read only memory), or semi-permanent memories such as an EROM (erasable read only memory), EEPROM (electrically erasable read only memory) or other preferably non-volatile memories or flash memories. The memory unit is used to store a plurality of models or more specifically digital data models (digital twin). The assignment of a digital model to a module of the memory unit is variable. For example, in a preparatory phase, it can be configured that one digital model is stored in one module of the memory unit in each case. It is likewise possible for a plurality of digital models to be grouped together in one module of the memory unit.

The term "digital model" is to be understood as meaning a digital data model comprising at least one trained neural network and preferably a set of neural networks. The model can also be understood as a digital twin for the physical device. The digital twin simulates the operating behavior of a component of the MR device. A number of digital models are provided according to the number of components of the MR device. The digital model represents or simulates the operating behavior of the respective component. The digital models are interconnected in a specific manner. This interconnection is precisely matched to the design, structure and/or functionality of the MR device with its components. By virtue of their interconnection, the set of digital models creates a higher-order (cross-component) model which overall simulates the operating behavior of the entire MRI scanner with all its components.

The MR device can comprise, for example, the following components: the electronically controllable mechanical components, such as the MR tube or enclosure or the patient table, the coils, such as the gradient coils, the magnet, the RF transmit coils, the RF preamplifiers, the pulse sequence controller, etc.

For each of these components, a digital twin or model is learned that represents the physical behavior of the system.

The log file (event log) comprises a list of entries of events of the MR device. In a simplified form, the list thus comprises at least three columns containing:
1. a time or a time difference (time delta) with respect to the previous event, preferably in an integer format;
2. an identification of the respective component, preferably in an integer format;
3. a categorical feature from which the semantic content of the event can be derived, preferably also in an integer format (pre-processing).

The rows can refer to the respective components. The data can advantageously be pre-processed.

The Get_log_objects( ) function splits the log lines of the text document (the log file) into a list of log objects.

The Keep_source( ) function is part of the user-defined library pre-processing_lib and allows the log_file entries to be filtered and only the desired sources to be retained for further processing.

In addition, an X and a Y label can be provided in order to enable the data to be read more efficiently in the log file (event log file). The X label is a window of size N that scrolls down in the log file, for example in the form "N×[delta T, source ID, Feature]".

The Y label is the next message (the next entry) from the source/component, for example in the form "[delta T, source ID, Feature]".

The aforementioned pre-processing of the data and feature extraction of the event log data enables the data to be used for deep learning models. The pre-processed data can be reused for any other model.

When there are no more sources/components in the log file, they are given the following designation: [−1, 0, 0]. Because of this last label, which is not contained in the source from the start, the value 0 is added to all source_enc and message_enc (for 1-hot encoding inside and outside the network).

The one-hot encoding is stored in a file (dictionary) for each component or source, both for the components and for the categorical features.

In a further development of the disclosure, additional detail data can be derived from the event log entries and/or metadata can be derived therefrom (for example, how much time has elapsed between two event log entries for the same component, etc.).

The time loss function is preferably the root mean square with possibly a negative loss value. The time data for the input is advantageously normalized.

The pre-processing can also relate to the categorical data. This means data or variables that contain labels (categories/label values), such as, for example, ordinal scaled or nominal scaled or metric variables. For example, a categorical variable is a "component" variable with the values: "patient table" and "coil". The number of possible values is often limited to a fixed set. Each value represents a different category. Many machine learning algorithms cannot work directly with labels. They require that all input and output variables are numerical. Therefore, all categorical data is converted into numerical form. For categorical variables where there is no ordinal relationship, integer encoding is not sufficient. In this case, one-hot encoding can be applied to the integer notation. Here, the integer encoded variable is removed and a new binary variable is added for each unique integer value.

The interaction of the digital twin models becomes visible through the dependencies corresponding to the physical reality and is likewise modeled in a system model. Each component receives the input of all the component-specific digital twin models and also receives all the outputs of the digital twin models.

In addition to a physical subdivision of the system, logical components (such as measuring system, monitoring system, etc.) which, for example, predominantly consist of pure software components, are also modeled, so that a total of several hundred digital twin models are provided.

All or selected digital models are preferably designed as a neural network. The neural network can preferably be implemented as a recurrent neural network (RNN) and preferably as a long short-term memory (LSTM) network. An important property of the LSTM network is that previous states can be stored, which can be symbolically equated with a memory of previous experiences. In one aspect, the LSTM network can comprise so-called cells which comprise three interfaces (gates) for removing or adding cell state information. Thus, an LSTM module can comprise three gates (in particular, an input gate, a forget gate, and an output gate) and an inner cell. A convolutional LSTM network is preferably used in which the activity of each neuron is computed via a discrete convolution. The data flow between the different gates and their inner cells is determined by vector and matrix operations. Further information on LSTM network architectures can be found in the publications of Jurgen Schmidhuber, for example in S. Hochreiter and J. Schmidhuber. LSTM can solve hard long time lag problems. In M. C. Mozer, M. I. Jordan, T. Petsche, eds, Advances in Neural Information Processing Systems 9, NIPS'9, pages 473-479, MIT Press, Cambridge MA, 1997.

The neural network architecture preferably has five layers.

The first layer, the input layer, of the neural network comprises the at least 3 said inputs.

After the input layer, the neural network architecture provides a second embedded layer for encoding the categorical features. This is followed by a third layer, a merging layer, for creating a data set that is then supplied as input variables in the fourth layer which comprises the LSTM network. The fifth layer, the output layer, is used to output three output variables:
1. a result time, delta t out, preferably in a floating format;
2. a result identification of the respective component, preferably as a one-hot vector;
3. a categorical result feature, preferably as a one-hot vector.

In a first aspect, a single model is provided, preferably implemented as an LSTM model, which has been trained on the total amount of operating data in a log file.

In a second aspect, a hierarchical LSTM model is provided having a plurality of levels, wherein the levels correspond to the physical structure of the MR device (for example, system, components, subcomponents, etc.). Here, the messages from the operating data are assigned to the respective components and subcomponents.

In a third aspect, a plurality of independent models are provided for all the components (for example, a first model for a first component, a second model for a second component, an nth model for an nth component, etc.). If the operating data are messages, in particular error messages, the respective models can be used to predict which component will issue which error message at which point in time. The calculated estimate preferably contains a statement as to how probable the calculated estimate is (reliability of the model estimate).

In the case of the operating data, a distinction must be made between two types or categories of operating data:
1. Actually measured operating data during the operation of the MR device. This can be, for example, a temperature of the component (for example, coil), an operating time, a signal strength, etc. It can also include: gradient coil currents and power, cable and gradient coil temperatures, RF system power, cooling system: cooling power, cooling water temperature, primary/secondary, water flow, and also in respect of the patient table: couch movement, traversing speed, in respect of the magnet: helium level, cold head temperature, heating power, helium pressure, in respect of the room temperature, patient cooling temperature, humidity, motion sensor data, shock sensor), in respect of the host computer (memory module temperatures, CPU temperatures, GPU temperature), in respect of the MPCU computers (board temperature, CPU temperature).
2. Operating data estimated or calculated by the method. This operating data relates to a future point in time and is not measured in real terms, but is computer-calculated. It is based on a predicted operating behavior of the MR device based on historical and learned model data.

The two categories of operating data (measured and estimated) mentioned above can preferably be compared against one another. In a preferred aspect, the predicted operating data is compared with the real measured operating data for alignment, so that if there is no alignment, calibration of the respective model can be performed.

The operating data relates to an event during the operation of the MR device, i.e. during an MRI scan, and can preferably be acquired from an event memory file (event log). The operating data can thus relate to event logs. The operating data is preferably transformed into a pre-configurable format (in order to be better processed in a model-based manner). The format can comprise a plurality of segments, for example, six: a timestamp indicating when the event occurred or was triggered by a system buffer; an information segment defining the type of event (for example a fault), a date segment that defines the time when the event was reported, a source segment representing the component to which the event relates, for example MRI_MSR; an identification segment that identifies the message if a plurality of messages are generated by a source or component; and/or a message segment identifying the event itself or its contents, for example "scan started, scan finished".

A system buffer can be a message memory. Two examples from a system log file (event log containing all the messages of one day) will now be given:
I=Information
D=Date (2020-08-10)
T=Time (07:09:45)
SRC=Message Source (MRI_FRR)
ID=Message ID (910)
Message contains, for example, gradient coil temperatures at this point in time.
I 2020-08-10 07:09:45
MRI_FRR 910 Current coil temperatures (degree C.): OVC1: 26.65, OVC2: 26.55, OVC3: 27.00, OVC4: 25.85, OVC5: 26.50, OVC6: 25.95, OVC7: 26.20, OVC8: 26.55, cable1: 23.25, cable2: 23.75, cable3: 23.25, board: 31.50
I 2020-08-10 07:09:45
MRI_FRR 910 Current coil temperatures (degree C.): GC_AVG: 21.11, GC1: 23.25, GC2: 23.25, GC3: 23.25, GC4: 21.00, GC5: 21.00, GC6: 21.00, GC7: 21.00, GC8: 21.50, GC9: 20.75, GC10: 21.00, GC11: 21.00, GC12: 20.75|Masks—GC1_4: 0xffff, GC5_8: 0xffff, GC9_12: 0xffff, GC9_12: 0xffff REF—1_OFF: 85.000000, 2_OK: 65.000000, 3_MAX: 125.000000, 4_LOW: 8.000000

In a preferred aspect, the operating data comprises messages from components, in particular error messages. The system can then be designed to proactively predict which component is likely to issue which type of message, in particular an error message, in the future and with what probability. In this case, the method can be applied while the MR device is in use in order to estimate the state of the MR device.

However, the model predictions can also be used to improve MR device production. For example, from the result indicating that particular components in different MR devices always produce error messages, it can be deduced that these components should preferably be replaced or exchanged with alternative components. In addition, further improvements to the manufacturing process can be made on the basis of the model predictions. For example, a trend in the production data can enable system characteristics to be predicted—training of the digital twin of the gradient coil. It is also possible to make model calculations and a comparison of the digital twin of the gradient coil with the real temperature data and to detect deviations, and learn from the past. Through learned deviations, a model can learn the relationship between factory values and system behavior. Using this model, desired characteristics of the system can be obtained by optimizing the manufacturing process. It can also be used to improve, i.e. optimize, application- and customer-specific characteristics of the MR device.

The result is a digital data set that can be provided in different formats. The result is preferably provided in a visual and/or audible format. For example, the result can be displayed as information on a user interface (for example a graphical user interface) in the form of a diagram. The advantage of this is that the result can be presented very quickly and easily and in a clear manner. The result can also be output as an audible warning signal, for example when component failure is imminent and a corresponding alarm must be raised. This can make the operation of the MR device safer.

In a preferred aspect, the result contains intermediate results. An intermediate result relates to a prediction result for a particular component. An intermediate result is therefore always component-specific and the computational result of a particular digital model or neural network, while the result is an overall result and thus cross-component and applying to the entire MR device.

The comparator is a digital processing unit which can be implemented in software and/or in hardware, and is used to compare or process the intermediate results calculated by the respective digital models in order to calculate the overall result.

BRIEF DESCRIPTION OF THE FIGURES

In the following detailed description of the figures, exemplary aspects that are not to be understood in a limiting sense together with their features and further advantages are discussed with reference to the drawings in which.

DETAILED DESCRIPTION

Description of the exemplary aspects shown in the figures.

Figure 1:
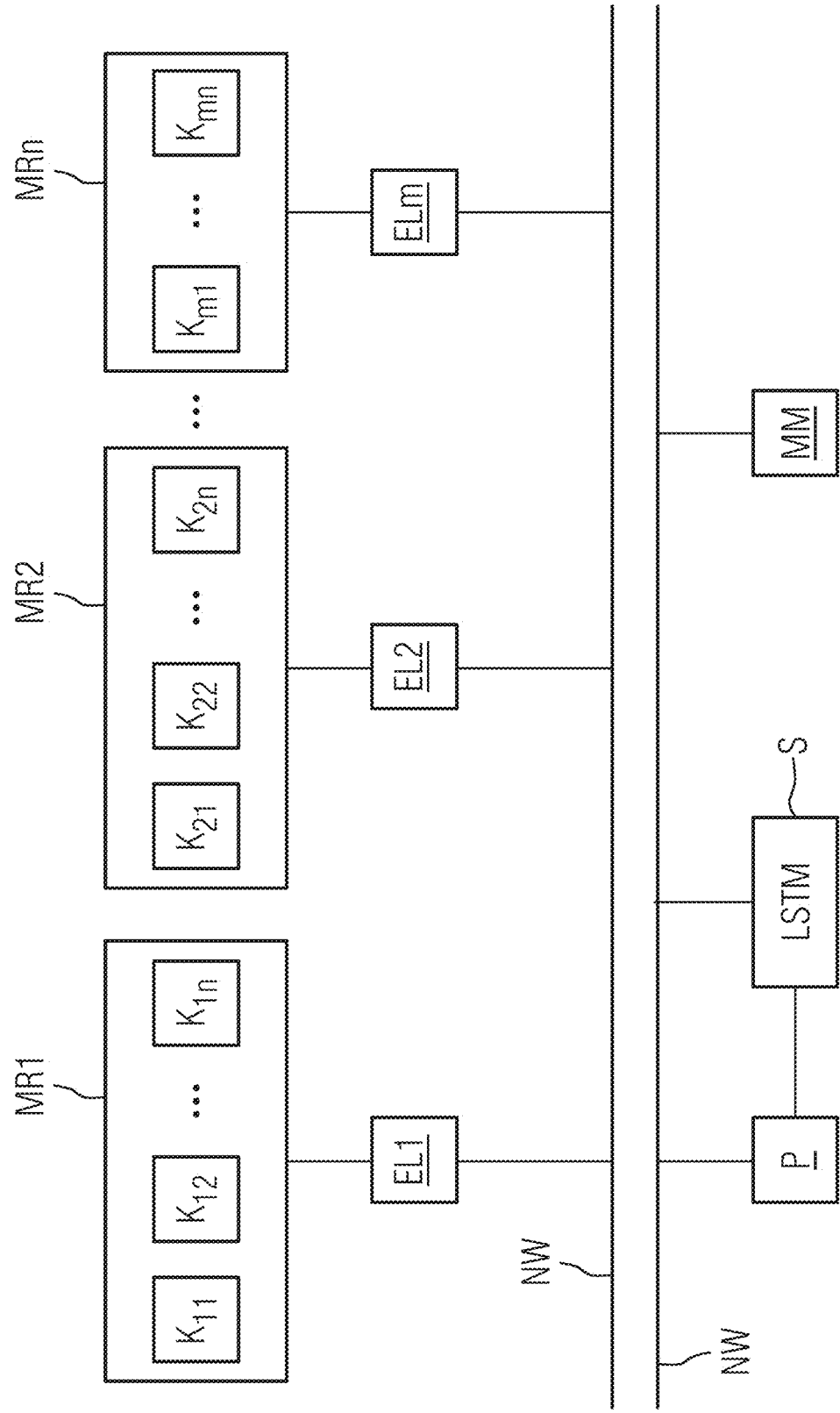
FIG. 1 shows an overview diagram of a system for estimating operating behavior according to a preferred aspect of the disclosure.

A system for estimating operating behavior of an MR device, denoted by the reference character MR, will now be described in more detail with reference to FIG. 1.

An MR device is nowadays usually operated in a networked manner and can exchange data with other electronic, medical, physical and/or information technology units via a network NW. FIG. 1 shows a first, second, . . . n-th MR device MR1, MR2, . . . MRn. The MR devices have different components K, such as sensors, a patient table, gradient coils, current/voltage supply elements, actuators, etc. In FIG. 1 this is shown schematically for the first MR device MR1, having the components K11, K12, ... K1n. In principle, the same or different components K can be installed in the different MR devices MR. Each MR device is provided with a so-called event log file. The event log file stores all the information that accrues during operation of the MR device, from system boot-up to device shutdown on the day of operation. The event log file EL thus contains all the operating data acquired during operation, for example in the form of messages or status indications, in particular also error messages. In the event log file EL, the aggregated operating data can be assigned to a specific component K. The operating data is preferably marked with a timestamp zs representing when the event occurred. Each MR device MR can thus have its own event log file EL which in turn comprises a plurality of segments for the different components K of the MR device MR. However, for sake of clarity, only one such event log file EL per MR device MR is shown in FIG. 1.

Each MR device MR has a data link, via the network NW, to a memory unit S and a processor unit P.

The memory unit S is used to store at least one model in the form of a neural network, in particular an LSTM network, which is available in a trained and tested form.

For training the neural network, annotated data can be used which assigns an associated operating behavior to a particular operating data set bd.

The term "operating behavior" identifies system states of the MR device MR. All states during operation of the MR device (during a scan) are subsumed under the operating behavior. Operating behavior can include a plurality of operating parameters. For example, the operating parameters include the scans, which scan sequences and protocols have been applied, the messages, in particular error messages, the number of reconstructed images, all image-related quality characteristics (image KPI—key performance indicators), all or selected messages that have been written to the event log file. Preferably, all the acquired operating parameters characterizing the operating behavior are time-stamped to be able to provide time resolution for subsequent calculations. In addition, it is advantageous if the recorded operating parameters can be unambiguously assigned to specific components K.

Figure 2:
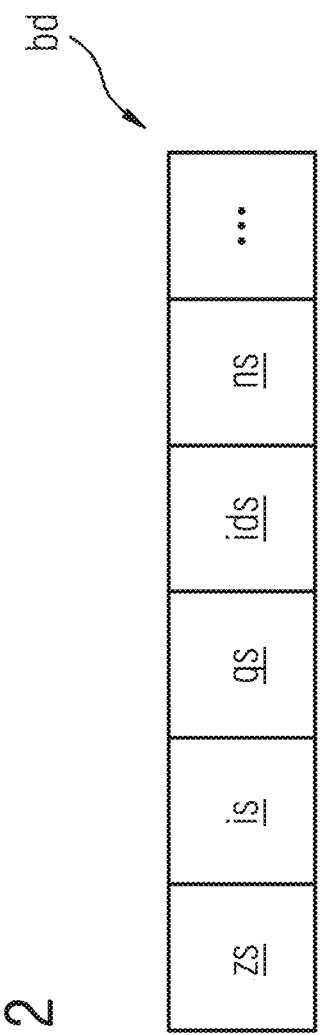
FIG. 2 shows a block diagram of an operating data set with further segments according to a preferred aspect of the disclosure.

FIG. 2 shows an example of operating data or rather an operating data set bd. As can be seen in FIG. 2, this operating data set bd has a plurality of different segments, in particular: a timestamp or a timestamp segment zs representing when the respective event to which the operating data bd relates was triggered; an information segment is which represents what type of event is involved, such as an error message or a normal status indication; a date segment ds representing when the respective entry in the event log file EL was generated by the system; a source segment qs representing the component K to which the respective message relates; this source segment qs advantageously makes it possible to assign each entry in the event log file to a specific component K; an identification segment ids which identifies the respective message of a particular component K if there are a plurality of messages from one and the same component K; and a message segment ns representing the content of the respective message or the respective entry in the event log file EL. Semantic information can be derived from this message segment ns, for example the message segment ns can characterize that a scan has been started and/or finished.

The timestamp zs is very important for processing in the digital models. With time, the data can be treated as time series data in which time itself can help the model to map the events as they occur. However, the current time format is not ideal for being fed into the model. A transformation is required to standardize the time. Therefore, an important feature is to use a delta-t approach, with calculation of a time difference between events. We know that many events having the same timestamp were triggered from the system buffer. This means that a batch of events always has the same timestamp, which means a delta t of 0. Thus, only the increment to the respective previous event is ever acquired and stored. This can reduce the volume of data to be transmitted, processed and stored.

In a preferred aspect of the disclosure, each event class is considered separately to calculate the time difference between the same event sources. A delta-t value can be used to observe the occurrence and correlation between the sources of the message (component K) in terms of their occurrence over time. Based on this knowledge, the main feature for both training of the digital network and prediction in the inference phase is the time difference delta t. Only one event source is considered at the same time. This defines an activation time of these event sources. During training, the time difference between the event sources of the same class is calculated.

The timestamp data therefore preferably undergoes pre-processing to enable it to be better and more easily fed to the digital model.

The pre-processing preferably also comprises: a selection function for a specific selection of operating data bd, a retrieval function for retrieving operating data or event logs, a removal function for removing numerical data, and/or an encoding function for encoding the operating data.

Numerical values must be removed from the text data. Sensor measurements also result in numerical values. However, the vector space must be reduced. To reduce the dimension in the vector space, the numerical values are extracted to obtain only the text, which is then regarded as the categorical part of the data. Categories can be classified, while continuous numerical values are considered as a regression problem to be confronted separately for the time being. A parser is preferably used to extract the numerical values.

Encoding is a necessary tool and procedure for carrying out a transformation from text to numbers. In addition, the function allows feature extraction to be performed in order to store the important dependencies, for example in the form of Python dictionaries. The advantage of using dictionaries are the key and value pairs that enable text to be identified using numbers. This allows us to use the values, which consist only of numbers, to perform machine learning calculations to obtain an output that we can later convert back to its text by identifying the output number using the key in the dictionary.

In an advantageous further aspect of the disclosure, the operating data bd can include other segments, such as in particular metadata and/or configuration data acquired from a preparatory configuration phase. For example, the configuration data can define which operating parameters are to be taken into account for defining the operating behavior.

Figure 3:
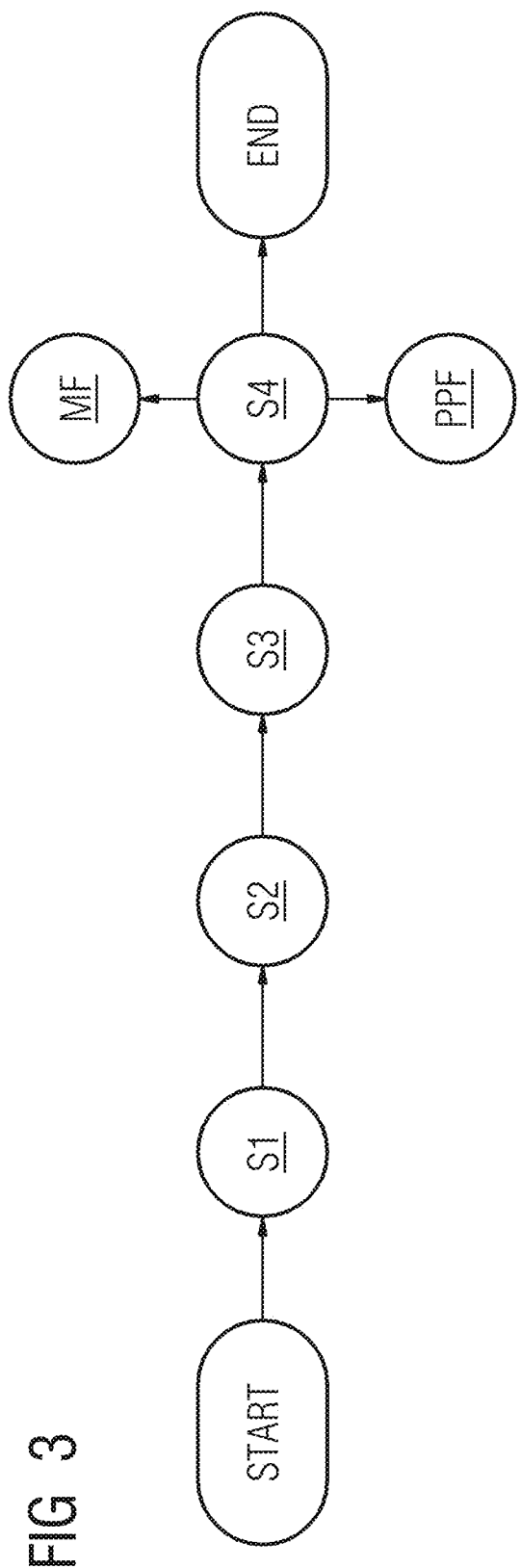
FIG. 3 shows a flow chart of a method as claimed in a preferred aspect of the disclosure.

FIG. 3 shows a sequence of a method according to a preferred aspect in the application phase of the trained neural network. After the start, acquisition of the operating data bd takes place in step S1. At a later time, the memory unit S with the LSTM model can be accessed in step S2 with the acquired operating data bd. The LSTM model has been trained to predict or estimate an associated future operating behavior for the acquired operating data bd. This takes place in step S3. In step S4, the result with the estimated operating behavior can be output. For example, the result can be output to a graphical user interface and/or forwarded to other computer-implemented instances. The method can then terminate or, alternatively, further processing steps can be performed. For example, the result can be used for a product planning function PPF to optimize production based on the estimated operating behavior. Cumulatively or alternatively, the result can be used for a monitoring function MF to enable further operation of the MR device MR to be improved based on the estimated operating behavior. For example, error-prone components K can be replaced here proactively and ahead of time, before they produce an image acquisition error. It is within the scope of the disclosure here to provide the result to other functions for further processing.

The at least one digital model can preferably be designed as a recurrent neural network (RNN), in particular as a convolutional network convRNN. An RNN cell of an RNN network stores and updates its inner (hidden) state as soon as new input data is available.

The digital model can be designed as a LSTM network. The LSTM network is preferably designed and trained to detect dependencies in the acquired operating data bd. Thus, correlations between events and patterns of operating data are automatically detected in the data.

Figure 4:
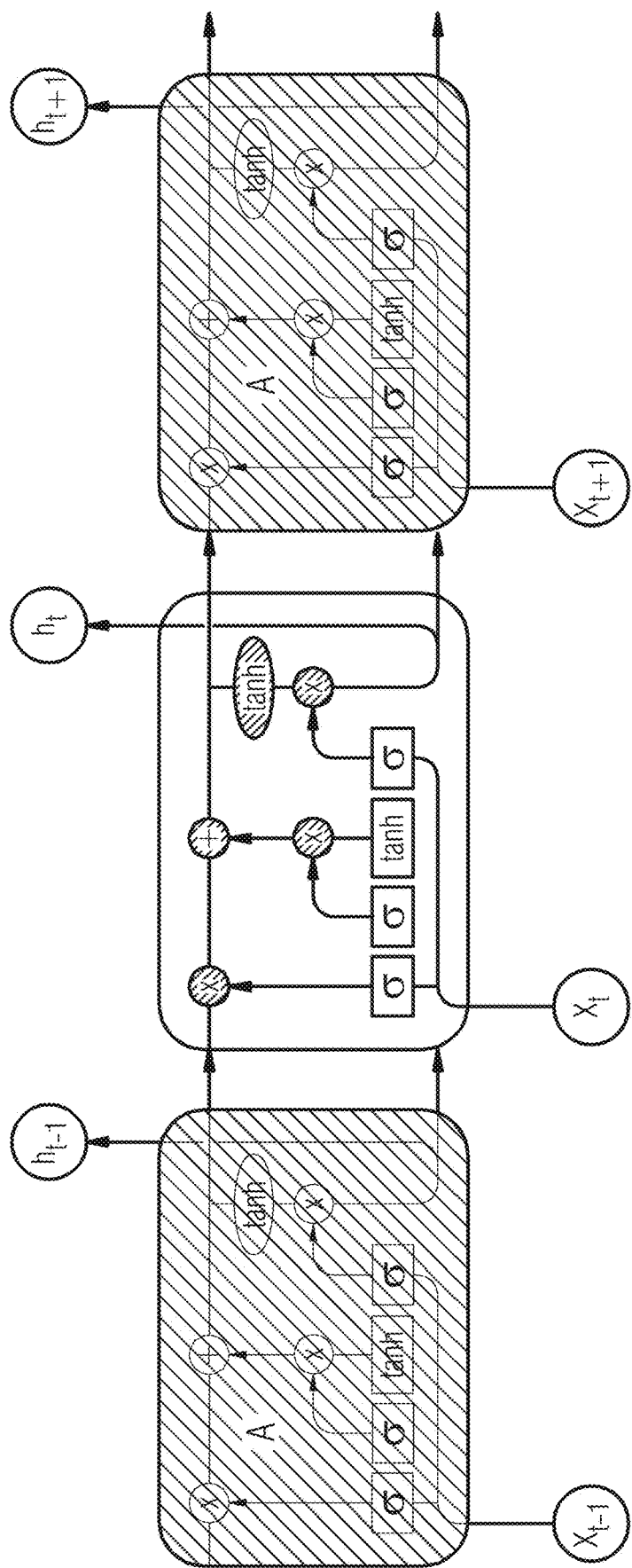
FIG. 4 shows a schematic diagram of an LSTM cell.

FIG. 4 shows a chain of LSTM cells. Here, X denotes the output of an LSTM cell and h denotes the input. LSTM networks are specifically designed to avoid the problem of long-term dependency. Like an RNN network, the LSTM network also has a chain-like structure; however, the repetition module has another, different structure with 4 neural network layers. In FIG. 4, each line carries an entire vector, from the output of one node to the inputs of the others. The cross-hatched circles represent pointwise operations, such as vector additions, while the square boxes are learned neural network layers. Lines that merge represent concatenation, while a line bifurcation means that its contents are copied and the copies go to different places.

For more details on LSTM networks, please refer to the publication by Hochreiter, Schmidhuber: Long Short-Term Memory, Neural Computation, 9(8): 1735-1780, 1997 as well as to Schmidhuber's other publications.

Figure 5:
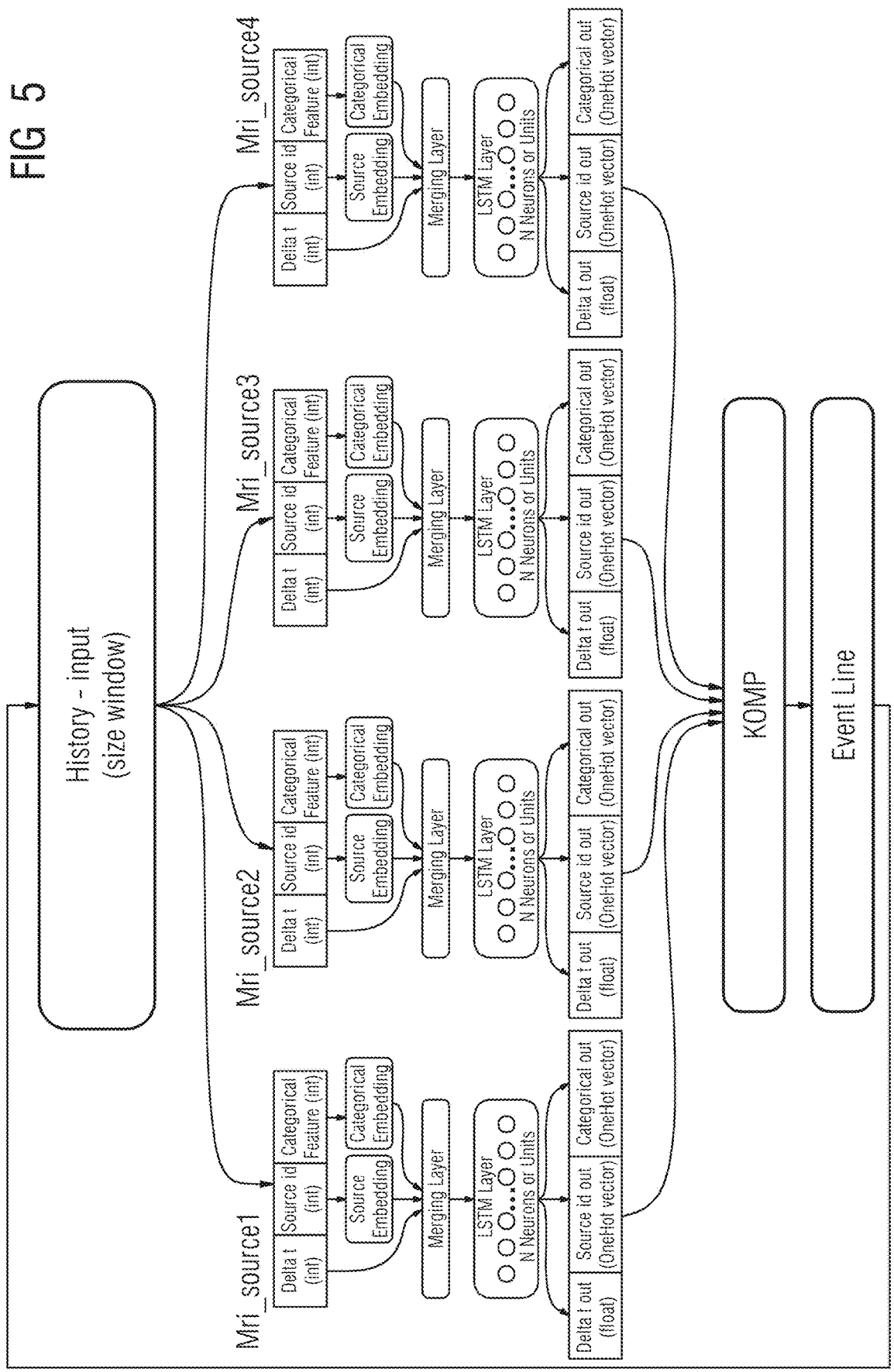
FIG. 5 shows an overview diagram of the architecture of the network according to a preferred aspect of the disclosure.

FIG. 5 schematically illustrates the basic model architecture. The acquired operating data bd is fed as input data to the different LSTM models. This is shown in FIG. 5 with the reference character "history—input". The addition "size window" is intended to indicate that the operating data bd can be configured differently and can have a different window size. In this case, a window of the respective size slides over the data, so to speak, like a frame.

In a preferred aspect of the disclosure, a sliding window approach is used in learning the model. The advantage of the sliding window approach is that it allows a fixed vector length for the LSTM network and thus a larger time period of the past for the history to memorize to be used in the model.

In addition, a reversal of the input data can be applied. Scientists have found that reversing the source sequence (feeding it backwards into the encoder) gives much better results because it shortens the path from the decoder to the relevant parts of the encoder. Similarly, entering an input sequence multiple times, for example twice, also seems to help a network remember things better. This is implemented in another preferred aspect of the disclosure.

In a preferred aspect, for each component K of the MR device MR, which shall be denoted by "Mri_source1/2/4" in FIG. 5, a separate LSTM network ("LSTM layer") has been trained and is provided in trained form for the method or system according to the disclosure. This is indicated in FIG. 5 by the different sources (source 1, . . . source4). After accessing of the individual, component-specific LSTM networks, intermediate results (component-specific) are provided. In a preferred aspect, these intermediate results can be fed to a comparator KOMP. The function of the comparator KOMP is to further process, in particular link, the intermediate results. For this purpose, the timestamp ZS can advantageously be used to analyze which operating data of which different components K has arisen at one and the same point in time in order to recognize corresponding patterns. A time coincidence means a global state which can be represented in multidimensional component states. Since there are dependencies between the components of a system in such a state, they can be learned by pattern recognition (using appropriate pattern recognition algorithms). In an even more complex type of comparator KOMP, a relationship to time-staggered events (for example learned from the past) can also be learned. For example, a scan start event seconds or minutes later can result in an increased temperature of a component which can be learned via the comparator as a pattern.

After processing by the comparator KOMP, the overall result with the estimated operating behavior can be provided. The result can be fed back to the processing line (event line) and/or to the digital models as new input data. The purpose of the feedback is to obtain a continuous time line into the future and thus be able to predict longer time periods than a time window. Thus, predictions of very long time periods of several days, weeks, or years are possible.

Figure 6:
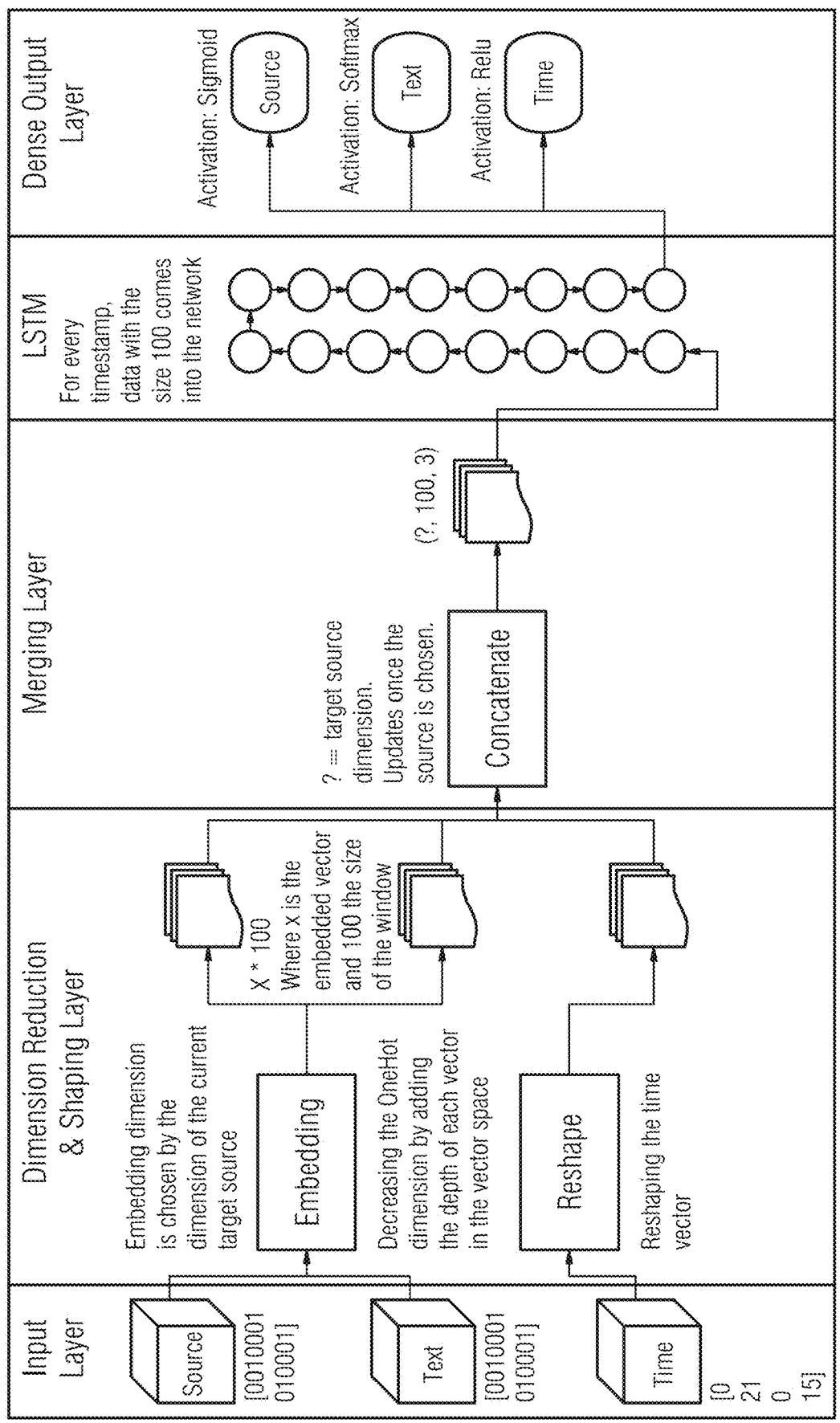
FIG. 6 shows another overview diagram of an LSTM network architecture according to a preferred aspect of the disclosure.

FIG. 6 gives an overview of the LSTM network architecture. The architecture can include an input layer, a dimension reduction & shaping layer, a merging layer for concatenating intermediate results, an LSTM layer, and a dense output layer.

Basically, the data to be processed must be pre-processed to enable it to be fed to the digital models for computation. This is because the way in which the data has been originally formatted, coming from the MR devices MR, does not fit into a deep learning model. First, deep learning models do not work with text data, and second, the data is too complex for unsupervised learning. Since the objective of the digital models is to simulate a digital MR system by generating event logs, the understanding of events and the correlation and dependencies of events must be conveyed. Therefore, a feature engineering solution is required to help the model understand the event logs. This means that the features can be automatically derived and generated from the data.

In a preferred aspect of the disclosure, a loss function is applied. The loss function helps to monitor the false predictions of the network. Depending on what data we are looking at, we need to choose an adaptive activation and loss function. The activation function is a mathematical function that takes the input data and executes the function therefore selected, in the case of the source this is the sigmoid function, to exceed or not exceed a particular threshold. The loss function or cost function describes the failure to reach the desired or expected value during training.

Finally, it should be noted that the description of the disclosure and the exemplary aspects are essentially not to be understood in a limiting sense with respect to any particular physical implementation of the disclosure. All of the features explained and illustrated in connection with individual aspects of the disclosure can be provided in different combinations in the subject matter of the disclosure in order to simultaneously realize their advantageous effects.

The scope of protection sought for the present disclosure is specified by the claims below and is not limited by the features explained in the description or shown in the figures.

In particular, it will be apparent to persons skilled in the art that the disclosure can be applied not only to production planning in the manufacture of MR devices, but also to the operation of MR devices already delivered to customers. Furthermore, the digital models can be implemented on a plurality of physical memories and therefore in a distributed manner.

The invention claimed is:

1. A method for computer-aided estimation of an operating behavior for an MR device having a set of device components, comprising:
    providing a memory with a set of digital models, wherein each digital model simulates an operating behavior of a respective component of the MR device, and the digital models are interconnected in accordance with the structure and/or functionality of the MR device to form a higher-order model which simulates the operating behavior of the MR device;
    acquiring operating data of the MR device; and
    during an inference phase:
        (i) accessing, by a processor, the memory storing the acquired operating data, and for each digital model, generating a component-specific intermediate result that represents a simulated operating behavior of the corresponding device component;
        (ii) comparing, by a comparator module, the component-specific intermediate results of the individual digital models against one another across the device components; and
        (iii) determining, based on the comparison, a result to estimate the operating behavior of the MR device; and
    outputting a result.

2. The method as claimed in claim 1, wherein the comparator module is configured to use timestamp data with the operating data for comparison.

3. The method as claimed in claim 1, further comprising:
    generating synthetic operating data using a Markov model in a training phase, wherein the synthetic operating data is generated based on historical operating data of the MR device; and
    training the digital models and/or the higher-order model using the synthetic operating data to predict future operating behavior of the MR device.

4. The method as claimed in claim 1, wherein the digital models and/or the higher-order model comprises a trained long short-term memory (LSTM) neural network.

5. The method as claimed in claim 1, further comprising:
    training each of the digital models individually from the set of digital models.

6. The method as claimed in claim 1, wherein the cross-component model is a higher-order cross-component model that is self-learning in that the estimated operating behavior is compared with a real operating behavior resulting from measured operating data to train the higher-order cross-component model in the event of deviation.

7. The method as claimed in claim 1, wherein the operating data comprises at least timestamp data and/or error messages, and the timestamp data is transformable according to a transformation rule.

8. The method as claimed in claim 1, further comprising:
    performing a pattern recognition algorithm on the acquired operating data and/or the estimated operating data, for gradient coil related operating parameters, for scan sequence related parameters, for excitation pulses, and/or for an operating temperature of coils.

9. The method as claimed in claim 1, wherein the acquisition of operating data is triggered automatically during operation of the MR device and is performed by readout from an event log file.

10. A non-transitory computer program product comprising a computer program code for carrying out a method as claimed in claim 1 when the computer program is executed on an electronic device, a server, and/or computer.

11. A server system for operating an MR device farm comprising a set of distributed MR devices, the server system comprising:
    data interfaces to the MR devices;
    a model interface to the memory; and
    a processor configured to carry out the method as claimed in claim 1.

* * * * *